United States Patent Office 3,525,258
Patented Aug. 25, 1970

3,525,258
WELL ANALYSIS METHOD AND SYSTEM
Ronald L. Fowler, Carroll A. Woolley, and Walter J. Bielstein, Houston, Tex., assignors to Esso Production Research Company
Filed Oct. 10, 1966, Ser. No. 585,452
Int. Cl. E21b 47/00
U.S. Cl. 73—155      23 Claims

ABSTRACT OF THE DISCLOSURE

Method and system for determining the long-term average of a varying characteristic (water percentage, fluid flow rate and/or gas-oil ratio of an oil well stream) capable of being measured and recorded. A convergence analysis technique to obtain repeatable measurements of such varying characteristic having a true long-term average value. A predetermined amount of the well stream is observed over successive segments, as, for example, 1-barrel segments, in which the average value of the characteristic is measured over selected constant incremental amounts of the well stream, as, for example, 1.3 barrels, from the start of each of the segments of the well stream until all of the incremental amounts of the well stream have been measured over the predetermined amount of the well stream under observation. The maximum and minimum average values of the characteristic are determined for all of the incremental amounts of the well stream and then delta ($\Delta$), the difference between the maximum and minimum values, is obtained. These steps are repeated, if necessary, with progressively larger incremental amounts of the flow stream until the delta ($\Delta$) obtained is equal to or less than a preselected value. Apparatus is disclosed to provide signals indicative of water percentage, flow rate and gas-oil ratio averages for any desired amount of the well stream and computer apparatus is proposed for determining if a representative sample has been observed.

---

The present invention concerns method and system for determining the true long-term average of a varying quantity capable of being measured and recorded. More particularly, the present invention concerns method and system for analyzing and measuring well stream behavior. Still more particularly, the present invention concerns method and system for testing and analyzing oil well streams to determine water percentage, fluid flow rate and/or gas-oil ratio.

Well streams which enter the well bore of an oil well are known to enter at a nearly constant rate and with nearly constant water percentage and gas-oil ratio. However, the fluid flow path causes the fluids to segregate into segments (separator dumps) which have values that are higher and lower than the true average values of flow rate, water percentage and gas-oil ratio. By observing such higher and lower values in these segments (separator dumps) and the length of the segments, the true average values of these characteristics of oil well streams can be determined.

In producing oil wells, production fluids composed of crude oil, gas and BS & W (Basic Sediment and Water) from various wells are mixed and sent to production and treater facilities to separate the crude oil from the other components. The behavior of individual wells is tested periodically by diverting production fluid from a particular well through test equipment to determine the water percentage, flow rate and/or gas-oil or gas-liquid (oil plus water) ratio of these production fluids. Since these characteristics of well streams change as the well stream flows to and is processed through the test equipment, it has been necessary heretofore to take an average of many measurements of these variable characteristics over a long period of time to insure accuracy in the determination of water percentage, flow rate and/or gas-liquid ratio values. The average value obtained in this way may not be an accurate indication of the water in the flow stream or the flow rate or the gas-oil ratio because it is not known whether the amount of well stream tested during the arbitrarily selected time test period is a representative sample of the well stream.

A primary object of the present invention is to provide a system and technique which are capable of making rapid, repeatable, accurate measurements of well stream behavior. Another object of the present invention is to reduce the amount of human time spent in routine well testing to measure well stream behavior. Still another object of the present invention is to enable the same testing system to provide more frequent tests when such tests are desirable. A further object of the present invention is to provide a system and method that determines with greater certainty than heretofore that a representative sample has been observed on a particular test.

The method of the present invention broadly comprises a convergence analysis technique to obtain repeatable measurements of a varying quantity having a true long-term average value. More specifically, the present invention comprises a method for analyzing a well flow stream to obtain the long-term average of at least one varying characteristic of the well stream in which a predetermined amount of said well stream is observed over successive segments which comprises the steps of (1) measuring the average value of said characteristic over selected constant incremental amounts of said well stream from the start of each of said segments of said well stream until all such incremental amounts of said well stream have been measured; (2) determining the maximum and minimum average values of said characteristic for all incremental amounts of said well stream; and (3) obtaining delta ($\Delta$), the difference between such maximum and minimum values. Steps (1), (2) and (3) are repeated, if necessary, with progressively larger incremental amounts of said well stream until the $\Delta$ obtained is equal to or less than a preselected value corresponding to the desired range of precision of the measurement of said characteristic.

The characteristic of the well stream to be measured may be water percentage or flow rate or gas-liquid ratio of the well stream. The segment of the well stream is preferably the volume of the flow stream in one dump of a fill-dump type gas-oil separator. The flow stream preferably continues to flow into the separator during dumps, which causes the amount of liquid in each dump to vary. However, the principle of the invention is not dependent upon such variation in each segment. For example, the water may be separated from the flow stream and the oil and water measured separately; or a device could be used which signals each time a barrel of oil and each time a barrel of water has passed a point in the flowline. Alternatively, the device could signal each time a barrel of liquid and either a barrel of oil or water, but not both, passed a point in the flowline. The fill-dump type separator in which the amount of liquid in each dump varies is preferred because the true long-term average values of the characteristics of the well stream being measured are obtained sooner than in the other cases. The incremental amounts of the flow stream are selected arbitrarily according to the system under consideration.

The average values of percent water and flow rate and gas-liquid ratio observed over a representative sample indicate the performance of the well. The number of separator dumps at which at least one representative sample has been observed times the amount of fluid in the representative sample is equal to the equivalent amount of production.

Briefly, the system for analyzing oil well streams to obtain a long-term average of at least one varying characteristic of said well stream in which a predetermined amount of said well stream is observed over successive segments of said well stream, in accordance with this invention, comprises means adapted to provide signals indicative of the start and end of each observed segment of said well stream; means adapted to provide signals indicative of the amount of liquid in each observed segment of said well stream; means adapted to provide signals indicative of values of at least one varying characteristic over each observed segment of said flow stream; and means adapted to record said signals preferably in computer-compatible form. The varying characteristics include water percentage, flow rate and total gas content.

The above objects and other objects and advantages of the invention will be apparent from a more detailed description thereof when taken with the drawings wherein:

FIG. 2(a-e) illustrates the manner in which a convergence well stream analysis may be made in accordance with the invention;

Figure 1:
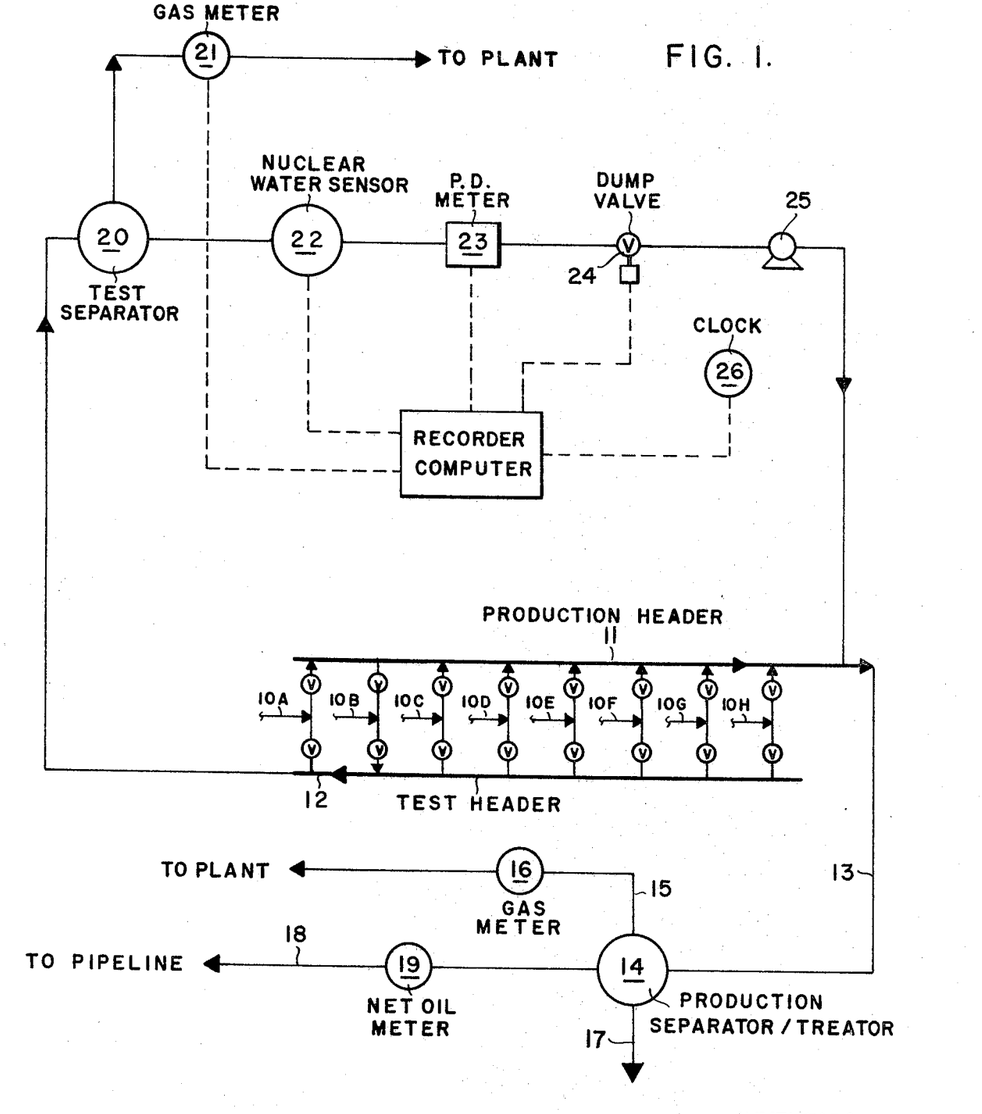
FIG. 1 is a flow sheet diagrammatically illustrating the test system of the present invention.

Referring to FIG. 1, production flow lines 10A–10H from individual oil wells are connected to a production header 11 and to a test header 12 through valves designated V. Production header 11 carries production well fluids from the individual wells to a pipeline 13 which conveys the well fluids to a production separator/treater which separates gas from the well stream. The separated gas is transmitted through a pipeline 15 to a gas meter 16 and thence to plant facilities. In the production separator/treater 14, BS & W is also separated from the crude oil as indicated at 17. The separated crude oil is transmitted to a pipeline 18 through an oil meter 19 which measures the net oil. When it is desired to determine the behavior of an individual well, e.g., when it is desired to analyze the well fluids flowing thru pipeline 10A, flow through pipeline 10A is diverted from production header 11 to test header 12, which transports the well stream to a fill-dump type test separator 20 in which gas is separated from the well stream. The gas passes through a gas meter 21 after which it flows to a suitable plant facility. The remainder of the well stream flows through a water sensor 22, a flowmeter 23 and a dump valve 24. A pump 25 is preferably utilized to pump the well fluids to production header 11. A clock 26 is also provided to record indications of the times at which each separator dump ended. Gas meter 21 transmits signals which, in conjunction with signals transmitted from dump valve 24 and flowmeter 23, provide information indicative of the total gas production through meter 21 over each separator dump. Water sensor 22 sends indications to the recorder which, in conjunction with the signals transmitted from the dump valve and the flowmeter, provides indications of the average water percentage observed over each separator dump. Likewise, indications of the average flow rate over each separator dump are provided by the signals transmitted from the flowmeter and the dump valve in conjunction with signals from clock 26. The recorder mechanism is preferably of the type which will record the information indicated by the gas meter, water sensor, flowmeter, dump valve and the clock in computer-compatible form.

The water sensor is preferably a nuclear density gauge and amplifier which provides a sensitive and accurate measure of the specific gravity of the well fluid. A Qualicon 5060 nuclear density gauge, which determines instantaneous percent water, is suitable instrumentation for use as water sensor 22. Flowmeter 23 may be suitably a conventional positive displacement meter modified to indicate passage of small increments of well liquid; e.g., each 0.1 barrel of well liquid.

The gas metering unit is preferably an integrating device which will provide a recordable measure of the cumulated gas production at the end of each separator dump. A Kingman White Flow Integrator Model 501 in combination with a standard orifice meter or a positive displacement gas meter are typical instrumentation which may be used for this measurement. A temperature transducer, not shown in the figures, also may be used to provide indications of the temperature at the nuclear density gauge at the end of each separator dump to compensate the system for variations in temperatures of the various well streams.

An electronic device is preferably used for computer interfacing that functions as follows:

Cumulate production from the positive displacement meter 23. The device outputs a switch closure for each 0.1 barrel of fluid which passes meter 23.

Cumulate time from clock 26. It outputs one switch closure per minute.

Cumulate the reading of the density gauge 22, one reading to be cumulated at each switch closure from the meter 23. The device provides from 0–1,000 switch closures at each switch closure of meter 23, depending on the gauge reading.

Cumulate gas production to the end of each dump. One switch closure is provided for each unit of gas produced.

Record the temperature at the end of each dump. From 0–1,000 switch closures are provided at the end of each dump according to the temperature at the nuclear density gauge 22.

Computer interfacing also may provide means for recording cumulated numbers at the end of each separator dump. A paper tape unit or other computer-compatible recording system may be used. Or, alternatively, the information may be read directly by the computer at the end of each separator dump, or at fixed time increments.

The data are recorded over a specified amount of production and the recorded output is preferably shipped to a computer for processing. Outputs from the computer program are average water percent, average flow rate, average gas-liquid ratio, representative production cycles and number of repetitions.

In the event the equipment is wired into a computer via a remote station, the output of the interfacing device is accumulated and read at the end of each dump. At that time, the computer can determine if a representative sample of production has been observed. If so, another well can be automatically shifted into the well stream analysis header. Otherwise, the well will continue to be tested. If a representative sample is not observed after a specified amount of production has been observed, or if an abnormally low flow rate is observed, the computer will so inform and proceed to test another well.

The following equations illustrate the manner in which data obtained by the apparatus are processed (preferably by computer) to analyze a well stream for average salt water percentage, average flow rate and average gas-liquid ratio.

EQUATION I $PROD_M$ = No. of gauge readings times fixed amount of production/reading.

If cumulated numbers are used,

EQUATION I'

$PROD_M = CUM\ PROD_M - CUM\ PROD_{M-1}$

EQUATION II $$AGR_M = \frac{\sum_{0}^{N} AGR_i}{N}$$

If cumulated numbers are used, an alternate calculation is,

EQUATION II'

$$AGR_M = \frac{CGR_M - CGR_{M-1}}{PROD_M}$$

Additionally, the dump number is noted together with the cumulated production to the end of the dump.

EQUATION III

The average water percentage for each dump is calculated as:

$$ASW_M = \frac{GR_O - AGR_M}{GR_O - GR_W} \times 100$$

EQUATION IV

The average flow rate for each dump is calculated as:

$$AFR_M = \frac{PROD_M}{dT_M - dT_{M-1}} \times 24$$

EQUATION V

The average gas-liquid ratio for each dump is calculated as:

$$AGLR_M = \frac{CG_M - CG_{M-1}}{PROD_M}$$

Where:

$PROD_M$ = Production during dump M (barrels)
$CUM\ PROD_M$ = Cumulated production to end of dump M
$CUM\ PROD_{M-1}$ = Cumulated production to end of dump $(M-1)$
$AGR_M$ = Average gauge reading during dump M
N = Number of gauge readings during dump M
$AGR_i$ = Instantaneous gauge reading at each fixed increment of production
$CGR_M$ = Cumulated gauge reading to end of dump M
$CGR_{M-1}$ = Cumulated gauge reading to end of dump $(M-1)$
$ASW_M$ = Average water percentage during dump M
$GR_O$ = Gauge reading full of oil at temperature of dump M (from calibration data)
$GR_W$ = Gauge reading full of water at temperature of dump M (from calibration data)
$AFR_M$ = Average flow rate during dump M (barrels/day)
$dT_M$ = Time dump M ended (hours)
$dT_{M-1}$ = Time dump $(M-1)$ ended (hours)
$CG_M$ = Cumulated gas production to end of dump M (cubic feet)
$CG_{M-1}$ = Cumulated gas production to end of dump $M-1$ (cubic feet)

The above data are then used to determine the indicated long-term water percentage, indicated long-term flow rate and indicated long-term gas-liquid ratio. One way in which such an analysis may be carried out is as follows.

Based upon the desired precision of the answer, the amount of calculations which can economically be performed, and (if known) the normal behavior of the well being tested, the following variables are selected.

Desired water percentage precision, $E_W$; desired flow rate precision, $E_F$; and desired gas-liquid ratio precision, $E_g$.

Initial point of analysis—X
Value by which X is to be iterated—N
Maximum value of X for an analysis—$X_{MAX}$ The cumulated average water percentage, X barrels after the start of each dump, is calculated from the equation:

EQUATION VI $$CU\ ASW_{X,\ M} = \frac{\sum_{M}^{P} ASW_m \times PROD_m + \left\{X - \left[\left(\sum_{M}^{P} PROD_m\right)\right]\right\} \times ASW_P}{X} \times 100$$

Where:

$CU\ ASW_{X,\ M}$ = Cumulated average water percentage observed during an incremental amount of liquid production X barrels after the start of dump M.

$$\sum_{M}^{P} ASW_m \times PROD_m$$

= Total water produced from start of dump M to start of dump P.

P = Number of the dump at which:

$$\sum_{M}^{P} PROD_m \leq X\ and\ \sum_{M}^{P+1} PROD_m > X$$

$ASW_P$ = Average water percentage during dump P.
X = A fixed amount of production input into the calculation.

$$\sum_{M}^{P} PROD_m$$

= Amount of fluid production from start of dump M to start of dump P.

This calculation is made for every dump after the start of which at least X barrels of production have been observed. (The calculation is not performed for dumps after the start of which less than X barrels of production have been observed.) Several values of $CU\ ASW_{X,\ M}$ are thus obtained and the total range of the values represents the spread of water percentage observed over any X barrels of production.

The difference between the MAXIMUM and MINIMUM values of the cumulated average water percentage X barrels after the start of dump M is determined and called $\Delta_X$. The above process is repeated with $X = X + N$ and the value of $\Delta_{X+N}$ is determined.

This process is continued until the value of X exceeds the input value of $X_{MAX}$ or the value of $\Delta$ has fallen below the input value of $E_W$. At the minimal observed value of $\Delta$, the long-term average water percentage is determined as:

Long-term average water percentage $$= \frac{MAXIMUM\ CU\ ASW + MINIMUM\ CU\ ASW}{2}$$

and the range of error (repeatability) is determined as:

$$Error = \pm \left(\frac{MAXIMUM\ CU\ ASW - MINIMUM\ CU\ ASW}{2}\right)$$

Where the MAXIMUM CU ASW and the MINIMUM CU ASW are evaluated at the value of X for which $\Delta$ is a minimum. Alternatively, the statistical mean and standard deviation of the observed values of CU ASW (at the value of X for which $\Delta$ is minimal) may be used in lieu of long-term average water percentage and error, (above), respectively. The value of X for which $\Delta$ is minimal corresponds to a representative sample of the flow stream for water percentage.

In a similar manner, the cumulated average flow rate is calculated X barrels after the start of each dump according to:

EQUATION VII $$CU\ AFR_{X,M} = \frac{X}{\left[\left(\sum_{M}^{P}\frac{PROD_m}{AFR_m}\right) + \left(\frac{X - \sum_{M}^{P}PROD_m}{AFR_P}\right)\right]}$$

Where:
$CU\ AFR_{X,M}$ = Cumulated average flow rate X barrels after the start of dump M.

$\sum_{M}^{P}\frac{PROD_m}{AFR_m}$

= Total time elapsed from start of dump M to start of dump P, days.
P = Number of dump at which $$\sum_{M}^{P} PROD_m \leq X\ \text{and}\ \sum_{M}^{P+1} PROD_m > X$$

$AFR_P$ = Average flow rate during dump P (barrels/day).

This process is repeated for every dump after the start of which X barrels of production have been observed, as previously described for the calculation of $CU\ ASW_{X,M}$. The MAXIMUM and MINIMUM values of $CU\ AFR_X$ are determined for the value of X, and the difference of the values is called $\Delta_{FX}$. The process is repeated with $X = X + N$ and the value of $\Delta_{F(X+N)}$ is determined. This is continued until the value of X exceeds the input value of $X_{MAX}$ or the value of $\Delta_{FX}$ has fallen below the input value of $E_F$. At the minimal observed value of $\Delta_F$, the long-term everage flow rate is determined as:

Long-term average flow rate $$= \frac{MAX\ CU\ AFR + MIN\ CU\ AFR}{2}$$

$$Error = \pm\left(\frac{MAX\ CU\ AFR - MIN\ CU\ AFR}{2}\right)$$

where the MAX CU AFR and MIN CU AFR are evaluated at the value of X for which $\Delta_F$ is minimal. Alternatively, the statistical mean and standard deviation of the values of CU AFR (at the value of X for which $\Delta_F$ is minimal) may be used in lieu of long-term average flow rate and error, respectively.

In a similar manner, the cumulated gas-liquid ratio is calculated X barrels after the start of each dump according to:

EQUATION VIII $CU\ AGLR_{X,M}$ $$= \frac{\sum_{M}^{P}(AGLR_m)(PROD_m) + \left\{X - \left[\sum_{M}^{P}PROD_m\right]\right\}AGLR_P}{X}$$

Where:
$CU\ AGLR_{X,M}$ = Cumulated average gas-liquid ratio X barrels after the start of dump M.

$\sum_{M}^{P}(AGLR_m)(PROD_m)$

= Total gas produced from start of dump M to start of dump P, cubic feet.
P = Number of dump at which $$\sum_{M}^{P} PROD_m \leq X\ \text{and}\ \sum_{M}^{P+1} PROD_m > X$$

$AGLR_P$ = Average gas-liquid ratio during dump P.

The process is repeated for all significant dumps as in the calculations of $CU\ ASW_{X,M}$ and $CU\ AFR_{X,M}$. The MAXIMUM and MINIMUM values of $CU\ AGLR_P$ are determined for the value of X and the difference of the values is called $\Delta_{GX}$. The process is repeated with $X = X + N$ and the value of $\Delta_{G(X+N)}$ is determined. This is continued until the value of X exceeds the input value of $X_{MAX}$, or the value of $\Delta_{GX}$ has fallen below the value of $E_g$. At the minimal observed value of $\Delta_{GX}$, the long-term gas-liquid ratio is determined as:

Long-term average gas-liquid ratio $$= \frac{MAX\ CU\ AGLR + MIN\ CU\ AGLR}{2}$$

$$Error = \pm\left(\frac{MAX\ CU\ AGLR - MIN\ CU\ AGLR}{2}\right)$$

where MAX CU AGLR and MIN CU AGLR are evaluated at the value of X for which $\Delta_G$ is minimal. Alternatively, the statistical mean and standard deviation of the values of CU ALGR (at the value of X for which $\Delta_G$ is minimal) may be used in lieu of long-term average gas-liquid ratio and error, respectively. The long-term gas-oil ratio may be determined as:

Long-term average gas-oil ratio = (long-term average gas-liquid ratio) times $$\left(\frac{1}{1 - \text{long-term average water percentage}}\right)$$

The confidence in a well test is presently based on the number of days for which a well has been tested. To obtain a corresponding level of confidence in the answers generated by the above procedure, the confidence is calculated as:

$$Confidence = \frac{(X)\left(1 + \frac{Total\ PROD\ observed - X}{(X)\frac{\Delta}{2}}\right)}{Long\text{-}Term\ Average\ Flow\ Rate}$$

Or, alternatively, $$Confidence = \frac{(X)(Number\ of\ dumps\ after\ which\ at\ least\ X\ barrels\ production\ were\ observed)}{AFR}$$

where X has the value at which $\Delta$ was minimal. The parameter of confidence (defined above) may be established for the test under consideration. One long-term analysis on a well will establish precision and confidence to be expected after a given amount of production. It is preferred that the number of dumps after which at least X barrels of production were observed shall be equal to or more than 25 dumps, in conformance with statistical theory. However, a lesser number of dumps may be acceptable based on experience.

The values from one long-term analysis can then be used to select initial input parameters X, $X_{MAX}$, $E_F$, $E_W$ and $E_g$ for future analysis.

In some instances, it may be that only one of the long-term average measurements (water percentage, flow rate or gas-oil ratio) is critical. In this case, the number of computations can be reduced by calculating the long-term average of the critical parameter first, and then resetting the values of X and $X_{MAX}$ equal to the value of X at which the first long-term average measurement was evaluated. The values of the other two (noncritical) long-term average measurements can then be computed as above without several iterations of the value of X.

Reference is now made to FIG. 2–$a(e)$ for a more specific illustration of the principle of convergence well stream analysis in determination of well stream behavior.

It is assumed in the example illustrated in FIG. 2 that alternate dumps (segments) of a separator are 100 percent oil and 100 percent water and that each dump is 1 barrel. As shown in FIG. 2(a), dump 1 is 0 percent water, dump 2 is 100 percent water, dump 3 is 0 percent water; etc. In FIG. 2(b), the cumulated average percent water is plotted versus production from the start of dump 1 in barrels of liquid. As shown at the end of dump 1, which contained all oil, the cumulated average percent water is 0 percent; while at the end of dump 2, the cumulated average percent water is 50 percent. At the end of dump 3, the cumulated average water percent is 33⅓ percent and at the end of dump 4 is 50 percent, etc.

Figure 2A:
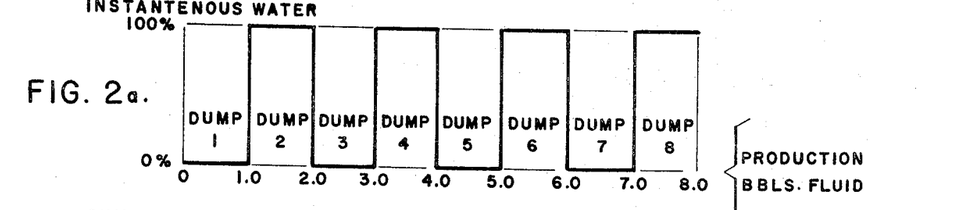
Figure 2B:
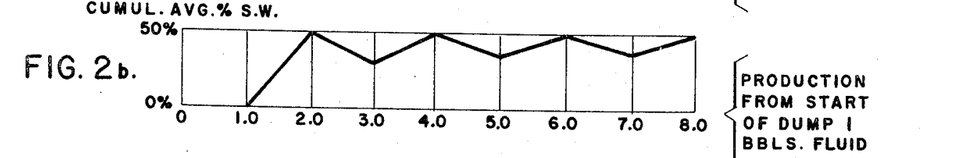
Figure 2C:
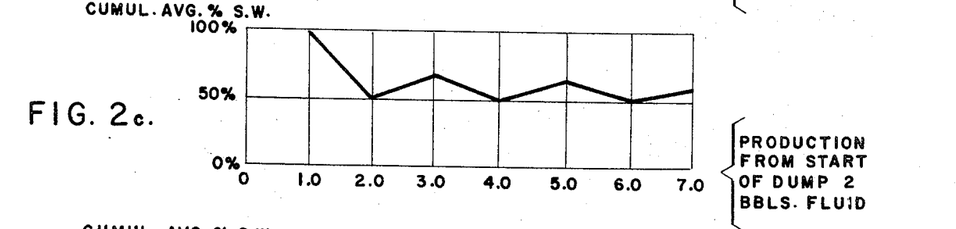

In FIG. 2(c), the cumulated average percent water is plotted versus production from the start of dump 2 in barrels of fluid. At the end of the first dump (dump 2), the cumulated average water percent is 100 percent; at the end of the second dump (dump 3), 50 percent; at the end of the third dump (dump 4), 66⅔ percent; at the end of the fourth dump (dump 5), 50 percent; and at the end of dump 6 (seven barrels of liquid), 57 percent, etc.

Figure 2D:
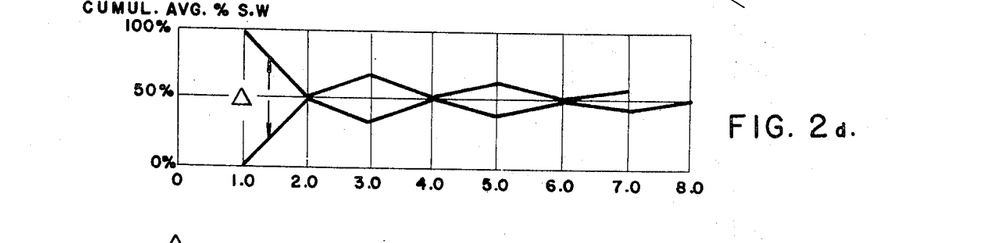

In FIG. 2(d), the gradually diminishing differences between the maximum and minimum cumulated average water percentages are illustrated by plotting FIGS. 2(b) and (c) on the same graph. The difference delta ($\Delta$) beginning with 100 percent difference at the end of dump 1 and no difference at the end of dump 2 gradually becomes less and less.

Figure 2E:
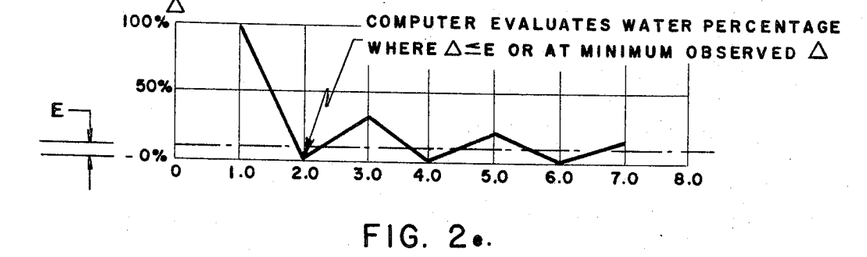

In FIG. 2(e), $\Delta$ is plotted, and as indicated by the arrow, the water percentage is evaluated where $\Delta$ is greater or less than E, a desired water percentage precision or at a minimum observed $\Delta$. This water percentage is equal to the average of the MAXIMUM and MINIMUM values of cumulated average water percentage observed as in FIG. 2(d).

Figure 4:
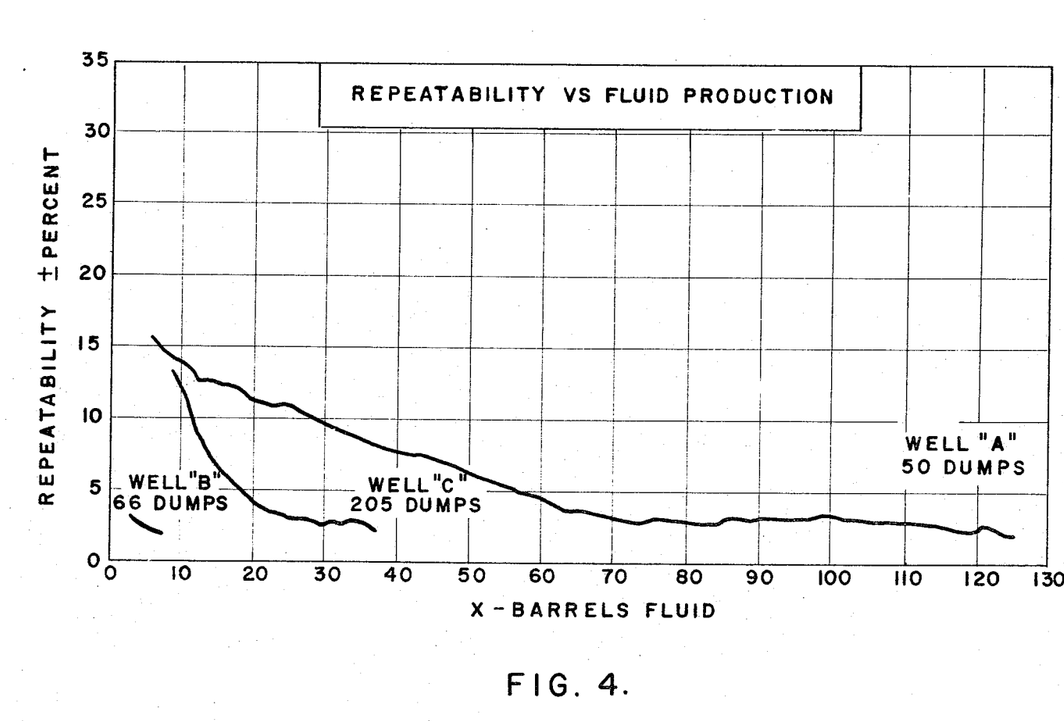
FIG. 4 is a plot of repeatability versus fluid production illustrating the repeatability observed at fixed amounts of production following the start of each dump and the number of dumps over which this repeatability occurred in the field tests of the well streams illustrated in FIG. 3.

The following numerical example illustrates determination of water percentage of a well flow stream in accordance with the teachings of the present invention. This example is related to the example of FIGS. 2(a) and (e) in which the first dump (segment) is 100 percent oil; the second dump is 100 percent water; etc. It is further assumed for purposes of illustration that: $E=5\%$; $X=1.3$ bbls. (increments); $X_{MAX}=1.9$ bbls.; $N=0.2$ bbls.; Average flow rate=10 bbls./day. The results of the calculated are tabulated in Table 1.

were analyzed in accordance with the convergence well stream analysis technique described with reference to FIG. 2. The results of these analyses for wells A, B and C are illustrated in FIG. 4, which is a plot of repeatability versus fluid production. Repeatability is equal to one-half of the value of $\Delta$ observed at each value of X, amount of production over which repeatability was calculated. The outputs for wells A, B and C are tabulated in Table 2.

TABLE 2

|  | Well A | Well B | Well C |
|---|---|---|---|
| Average water percent (from analysis) | 89.7±1.9 | 43.0±2.0 | 17.8±1.8 |
| Value of X for which $\Delta$ is minimum in bbls. liquid | 125.0 | 6.8 | 33.0 |
| Total production observed bbls. liquid (for analysis) | 194.3 | 138.0 | 207.5 |
| Overall average water percent (total production observed for analysis) | 88.1 | 42.7 | 18.3 |
| Number of dumps | 50 | 66 | 205 |
| Test time (for downstream measurement) hours | 24 | 24 | 48 |
| Test results, water percent (measured downstream) | 90.15 | 45.7 | 17.78 |

It is seen from these data that the flow stream from well A periodically varied substantially in water percentage and the water percentages were high, whereas the flow stream from well B varied little and was at lower percentages. The flow stream from well C had still lower water percentages, but fluctuations were greater and more frequent than in the cases of the flow streams from wells A and B. It is to be noted that the water percentage determined from short-term well stream analysis of each of the wells A, B and C compares very favorably with the average water percentage measured downstream over a long period of time for each of the well streams (in accordance with conventional practices used heretofore), as shown in Table 2.

Figure 5:
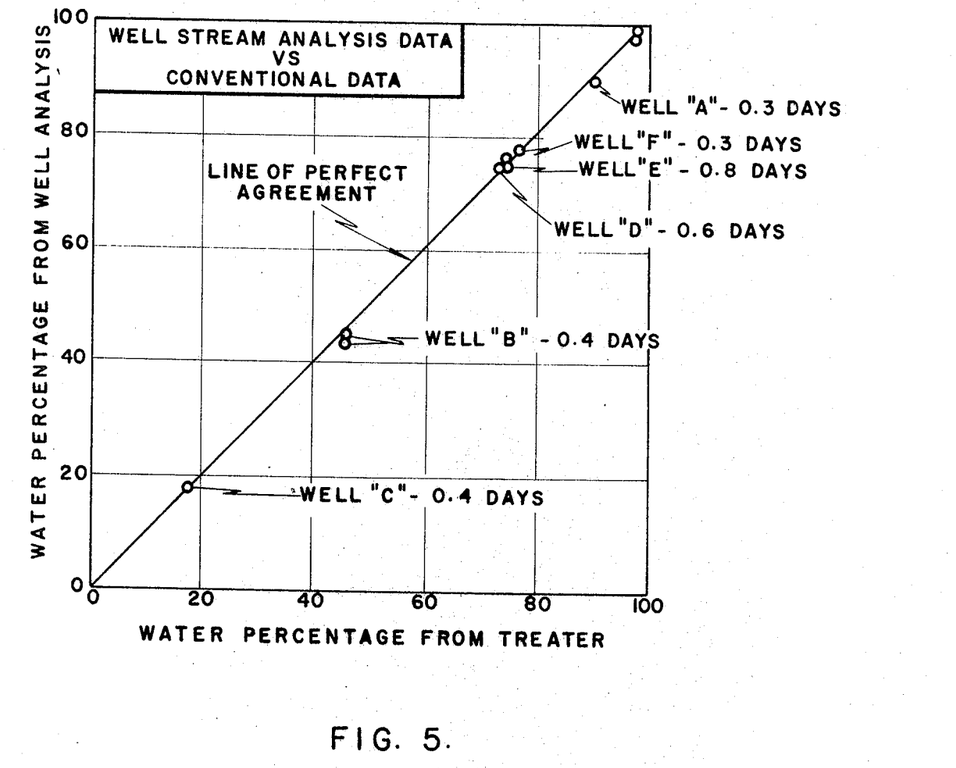
FIG. 5 is a plot of the well stream analysis data obtained in accordance with the teachings of the present invention versus conventional data for several wells.

Additional wells were tested in a similar manner and, as illustrated in FIG. 5, in which the well stream analysis data is plotted versus conventional data for many wells, substantially perfect agreement was obtained. In each case, the well observation period required for accurate water percentage determination was substantially less than is normally required for valid production tests using conventional practices. The designation of days in FIG. 5 refers to time required for short-term analysis on these wells. The long-term analysis for these wells ranged from one to two days, as shown for wells A, B and C in Table 2.

Variations and modifications of the invention may be made without departing from the spirit and scope therof. For example, the average density of a crude oil stream could be determined in accordance with the teachings of the present invention where water percentage in the stream is known or negligible. Also, the system and method of this invention could be used to determine the magnitude of a representative sample of a varying quan-

TABLE 1

|  | Dump No. |  |  |  |  |  |  |  | Max. avg. water, percent | Min. avg. water, percent | $\Delta$ |
|---|---|---|---|---|---|---|---|---|---|---|---|
|  | 1 | 2 | 3 | 4 | 5 | 6 | 7 | 8 |  |  |  |
| (1) X=1.3 bbl., avg. water, percent | 23.1 | 76.9 | 23.1 | 76.9 | 23.1 | 76.9 |  |  | 76.9 | 23.1 | 53.8 |
| (2) X=1.5 bbl., avg. water, percent | 33.3 | 66.7 | 33.3 | 66.7 | 33.3 | 66.7 |  |  | 66.7 | 33.3 | 33.4 |
| (3) X=1.7 bbl., avg. water, percent | 41.2 | 58.8 | 41.2 | 58.8 | 41.2 | 58.8 |  |  | 58.8 | 41.2 | 17.6 |
| (4) X=1.9 bbl., avg. water, percent | 47.4 | 52.6 | 47.4 | 52.6 | 47.4 | 52.6 |  |  | 52.6 | 47.4 | 5.2 |

NOTE:
At (4) $X=X_{MAX}$; and

Average Water, percent $= \frac{52.6+47.4}{2} = 49.9$.

Error $= \frac{52.6-47.4}{2} = 2.6$.

Number of dumps=6.

Confidence $= 6 \times \frac{1.9}{10 \text{ (Avg. Flow Rate)}} = \frac{11.4}{10} = 1.14$ days;

Actual Observation $= \frac{8}{10} = 0.8$ day.

As mentioned previously, it would be desirable to continue observation of this well stream until the number of dumps at the evaluation point $X_{MAX}$ equaled or exceeded 25 dumps; however previous experience on a particular well dictate acceptance of an answer as above.

Figure 3:
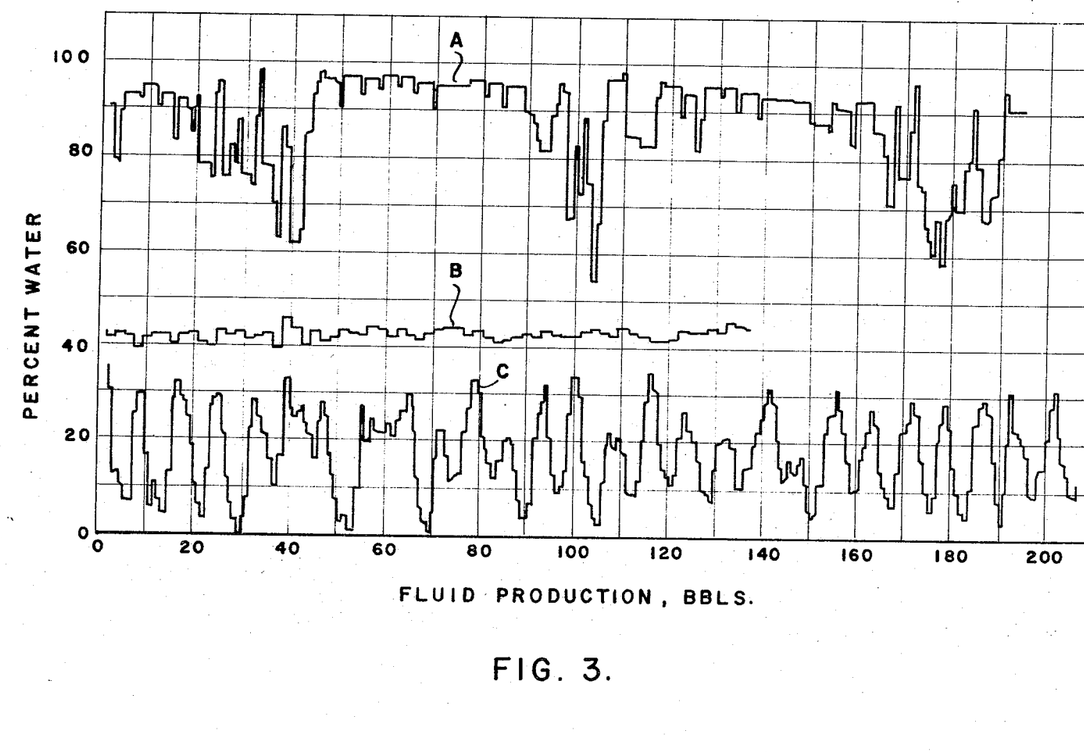
FIG. 3 is a plot of water percentage versus fluid production illustrating average water percent observed over each dump during field tests of well streams from three different wells.

In FIG. 3, water percentage versus fluid production data for three wells, A, B, and C, are shown. These data tity, as previously noted in the discussion of determination of the long-term average water percentage of an oil well stream.

Having fully described the system, method and operation of our invention, we claim:

1. An automatic system for analyzing a moveable quantity having a path of movement to obtain a long-term average of at least one varying characteristic of said quantity in which a predetermined amount of said quantity is observed over successive segments of said quantity comprising:

means adapted to provide signals indicative of the start and end of each segment of said quantity;

means adapted to provide signals indicative of the amount of said quantity in each segment;

means adapted to provide signals indicative of values of said varying characteristic measured at a fixed point along said path of movement of said quantity;

means adapted to record said signals correlatively; and means adapted to utilize said signals to obtain said long-term average of said varying characteristic.

2. An automatic system for analyzing a flowing oil well stream having a path of flow to obtain a long-term average of at least one varying characteristic of said well stream in which a predetermined amount of said well stream is observed over successive segments of said well stream comprising:

means adapted to provide signals indicative of the start and end of each observed segment of said well stream;

means adapted to provide signals indicative of the amount of liquid in each observed segment;

means adapted to provide signals indicative of values of at least one varying characteristic over each observed segment of said well flow stream measured at a fixed point along the path of flow of said oil well stream;

means adapted to record said signals correlatively; and means adapted to utilize said signals to obtain said long-term average of said varying characteristic.

3. A system as recited in claim 2 in which said varying characteristic comprises water percentage.

4. A system as recited in claim 3 in which said means adapted to provide signals indicative of said water percentage comprises nuclear sensing means capable of determining the instantaneous density of said well stream and of converting said density measurements to signals representative of instantaneous water percentage of said well stream.

5. A system as recited in claim 2 in which said varying characteristic comprises flow rate.

6. A system as recited in claim 5 in which said means adapted to provide signals indicative of said flow rate comprises a flowmeter and timing means.

7. A system as recited in claim 2 in which said varying characteristic comprises total gas content.

8. A system as recited in claim 2 in which said means adapted to provide signals indicative of the start and end of each segment of said well stream includes a fill-dump type gas-oil separator provided with means adapted to signal the start and end of each separator dump.

9. A method for determining the amount of an oil well stream to be analyzed to obtain a long-term average value of at least one varying characteristic of said well stream in which a predetermined amount of said well stream is observed over successive segments comprising the steps of:

(1) measuring the average value of said characteristic over selected constant incremental amounts of said well stream from the start of each of said segments of said well stream until all said incremental amounts of said well stream have been measured up to said predetermined amount of said well stream under observation;

(2) determining the maximum average value and the minimum average value of said characteristic for all incremental amounts of said well stream measured;

(3) obtaining delta ($\Delta$), the difference between said maximum and minimum values;

(4) repeating the above steps 1, 2, and 3 for selective successively larger incremental amounts of said well stream; and (5) measuring the amount of said well stream flowing from the start of the test until the measured value of delta ($\Delta$) is equal to or less than a preselected value.

10. A method as recited in claim 9 in which steps (1), (2), and (3) are repeated for selected, successively larger incremental amounts of said well stream until delta ($\Delta$) is equal to or less than a preselected value.

11. A method as recited in claim 9 in which steps (1), (2), and (3) are repeated for selected successively larger incremental amounts of said well stream until said successively larger incremental amounts exceed a preselected incremental amount.

12. A method as recited in claim 10 in which said characteristic is percentage of water.

13. A method as recited in claim 10 in which said characteristic is rate of flow.

14. A method as recited in claim 10 in which said characteristic is gas-liquid ratio.

15. A method as recited in claim 10 in which said segment of said well stream consists of the amount of liquid in each fill-dump cycle of a fill-dump type gas-oil separator.

16. A method as recited in claim 15 in which said characteristic is percentage of water.

17. A method as recited in claim 16 in which the average value of said characteristic is the cumulated average water percentage (CU $ASW_{X, M}$), over an amount of liquid, (X), from the start of each separator dump calculable from Equation VI set forth previously in this patent specification.

18. A method as recited in claim 15 in which the characteristic is rate of flow.

19. A method as recited in claim 18 in which the average value of said characteristic is the cumulated average flow rate (CU $AFR_{X, M}$), over an amount of liquid, (X), from the start of each separator dump calculable from Equation VII set forth previously in this patent specification.

20. A method as recited in claim 15 in which said characteristic is gas-liquid ratio.

21. A method as recited in claim 20 in which the average value of said characteristic is the cumulated gas-liquid ratio (CU $AGLR_{X, M}$), over an amount of liquid, (X), from the start of each separator dump calculable from Equation VIII set forth previously in this patent specification.

22. A method for determining the amount of an oil well stream to be analyzed to obtain a long-term average value of at least one varying characteristic of said well stream in which a predetermined amount of said well stream is observed over successive segments of said well stream comprising the steps of:

obtaining first signals indicative of the start and end of each observed segment of said well stream;

obtaining second signals indicative of the amount of liquid in each observed segment of said well stream;

obtaining third signals indicative of values of said characteristic of each observed segment of said well stream;

transmitting said first, second and third signals to computer means adapted to perform the following steps:

measure the average value of said characteristic over selected constant incremental amounts of said well stream from the start of each of said segments of said well stream until all said incremental amounts of said well stream have been measured up to said predetermined amount of said well stream under observation;

determine the maximum average value and the minimum average value of said characteristic for all incremental amounts of said well stream measured;

obtain delta ($\Delta$), the difference between said maximum and minimum values;

repeat the above steps of measuring the average value of said characteristic and obtaining delta (Δ) for selective successively larger incremental amounts of said well stream until delta (Δ) is equal to or less than a preselected value; and measuring the amount of said well stream flowing from the start of the test until the measured value of delta (Δ) is equal to or less than said preselected value.

23. A method as recited in claim 22 in which said characteristic is percentage of water.

References Cited
UNITED STATES PATENTS

| | | |
|---|---|---|
| 2,836,359 | 5/1958 | Mazzagatti. |
| 3,014,362 | 12/1961 | True et al. ___________ 73—53 |

RICHARD C. QUEISSER, Primary Examiner

J. W. MYRACLE, Assistant Examiner

U.S. Cl. X.R.

73—198